Dec. 17, 1935.  R. S. BUTLER  2,024,426
FILTER
Filed Sept. 19, 1931  7 Sheets-Sheet 6
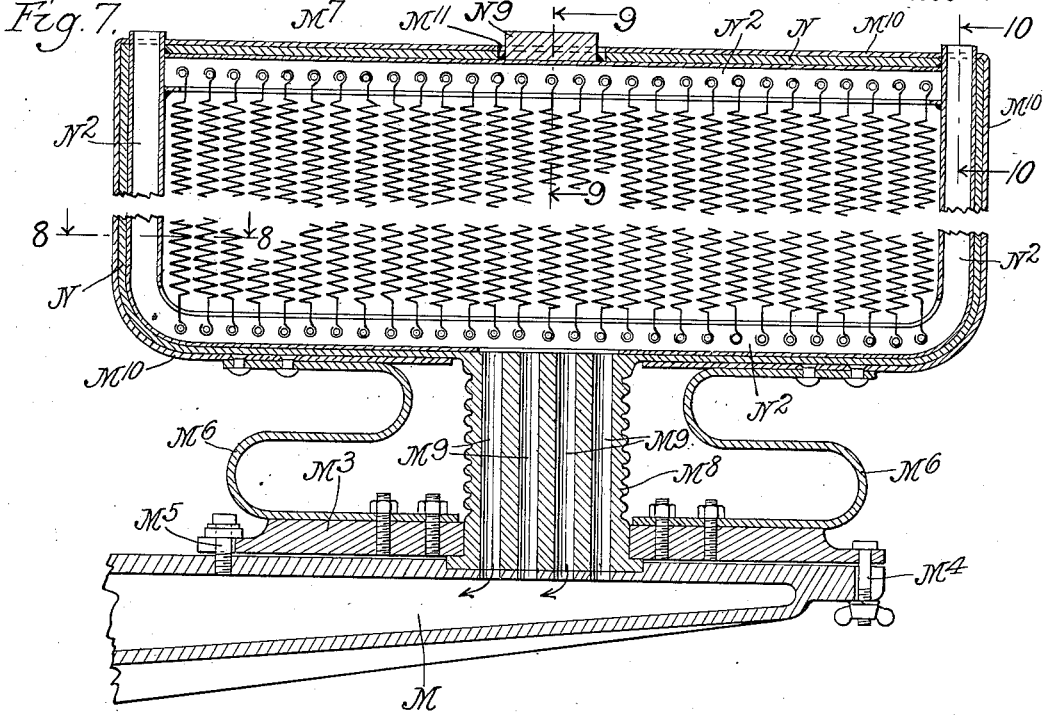
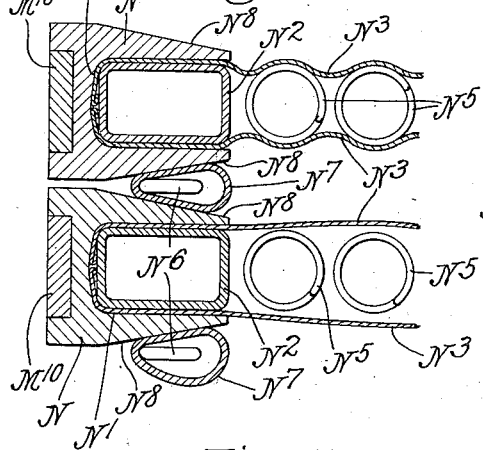
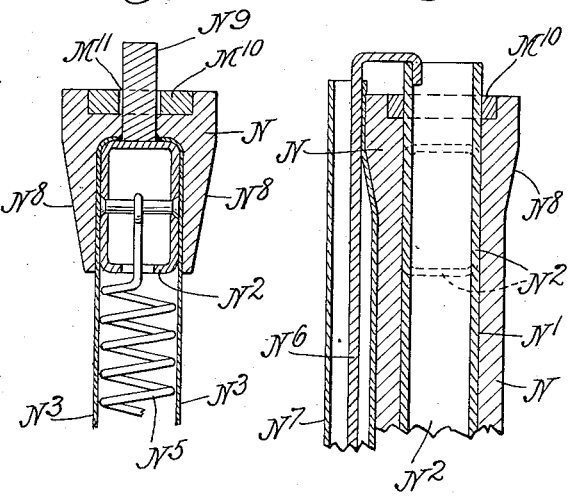
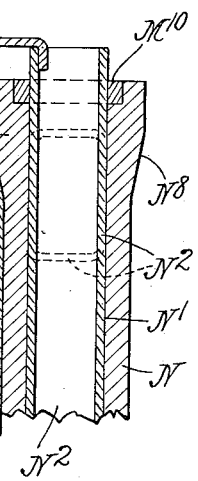
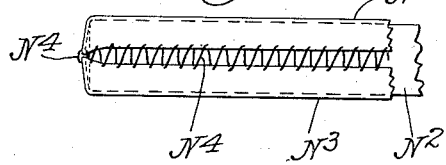
Inventor
Robert S. Butler
by Parker & Carter
Attorneys.

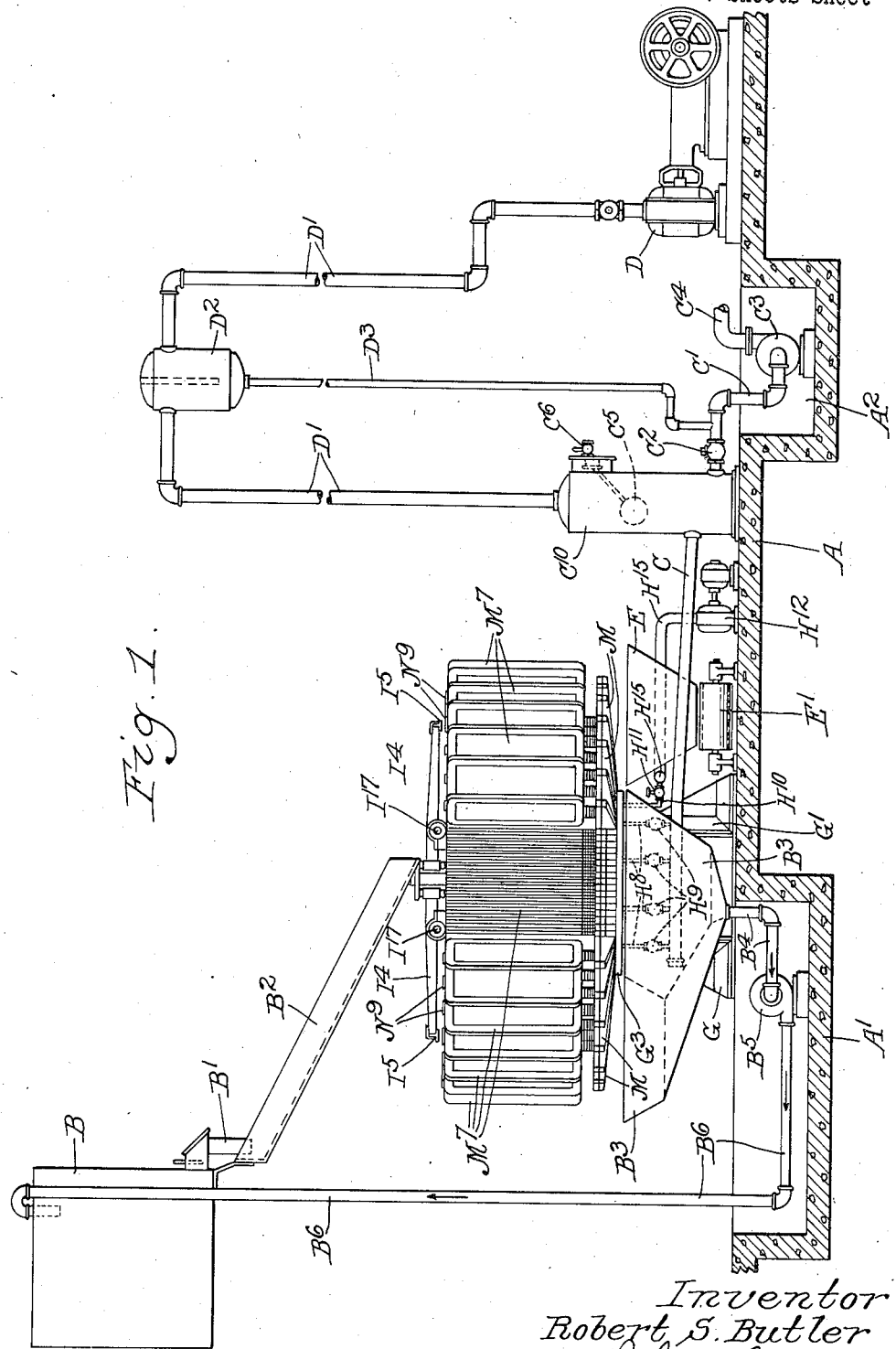

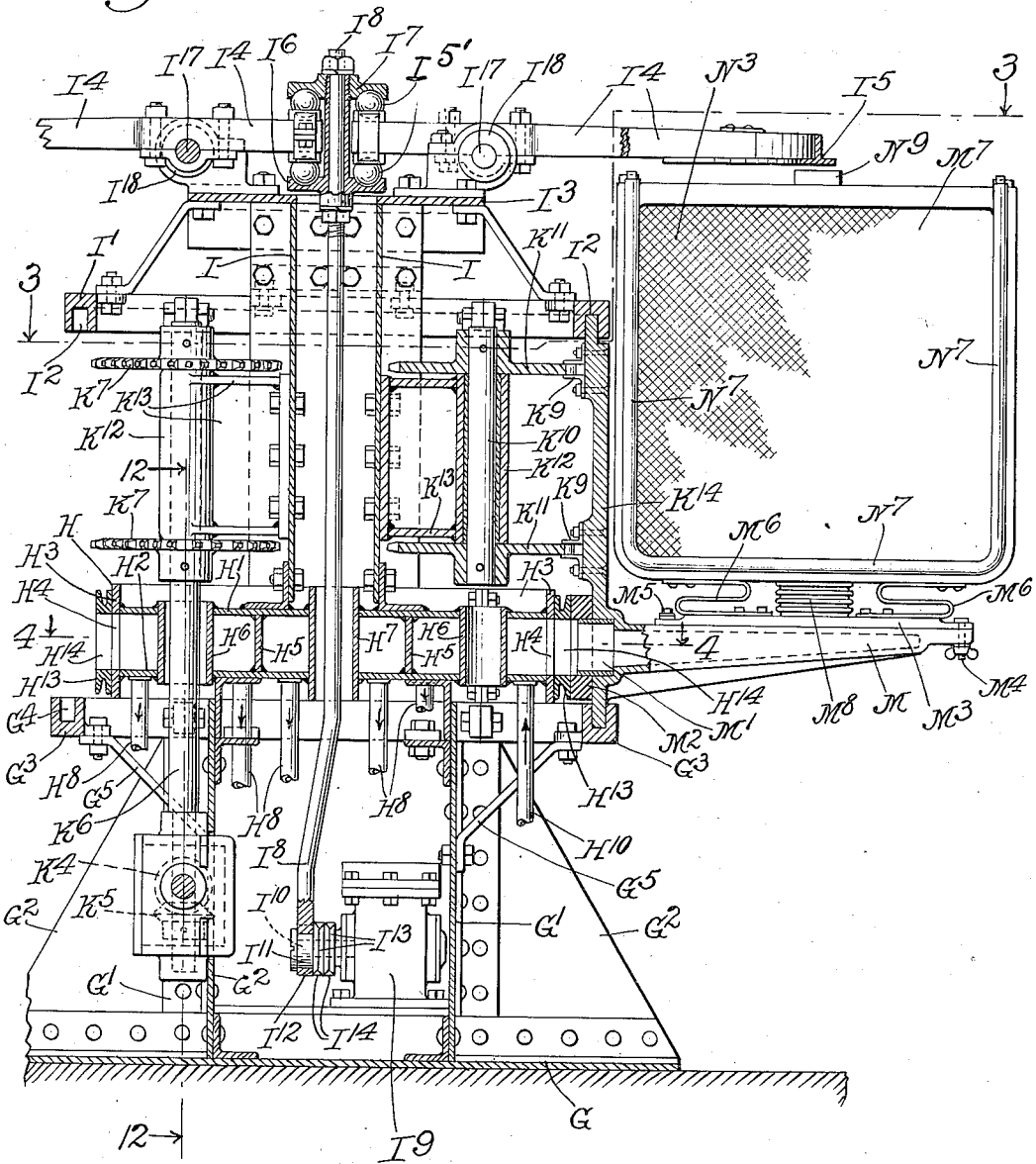

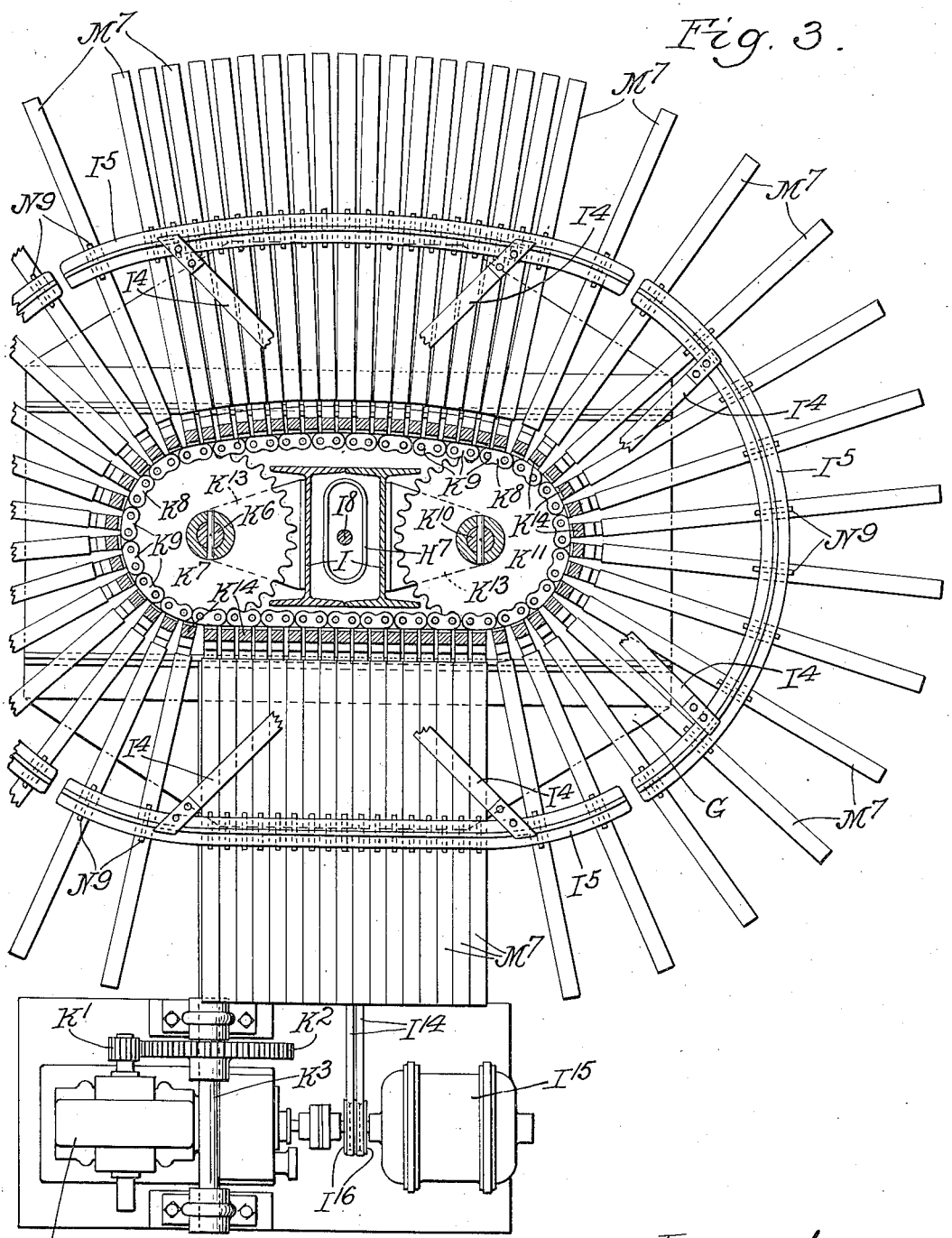

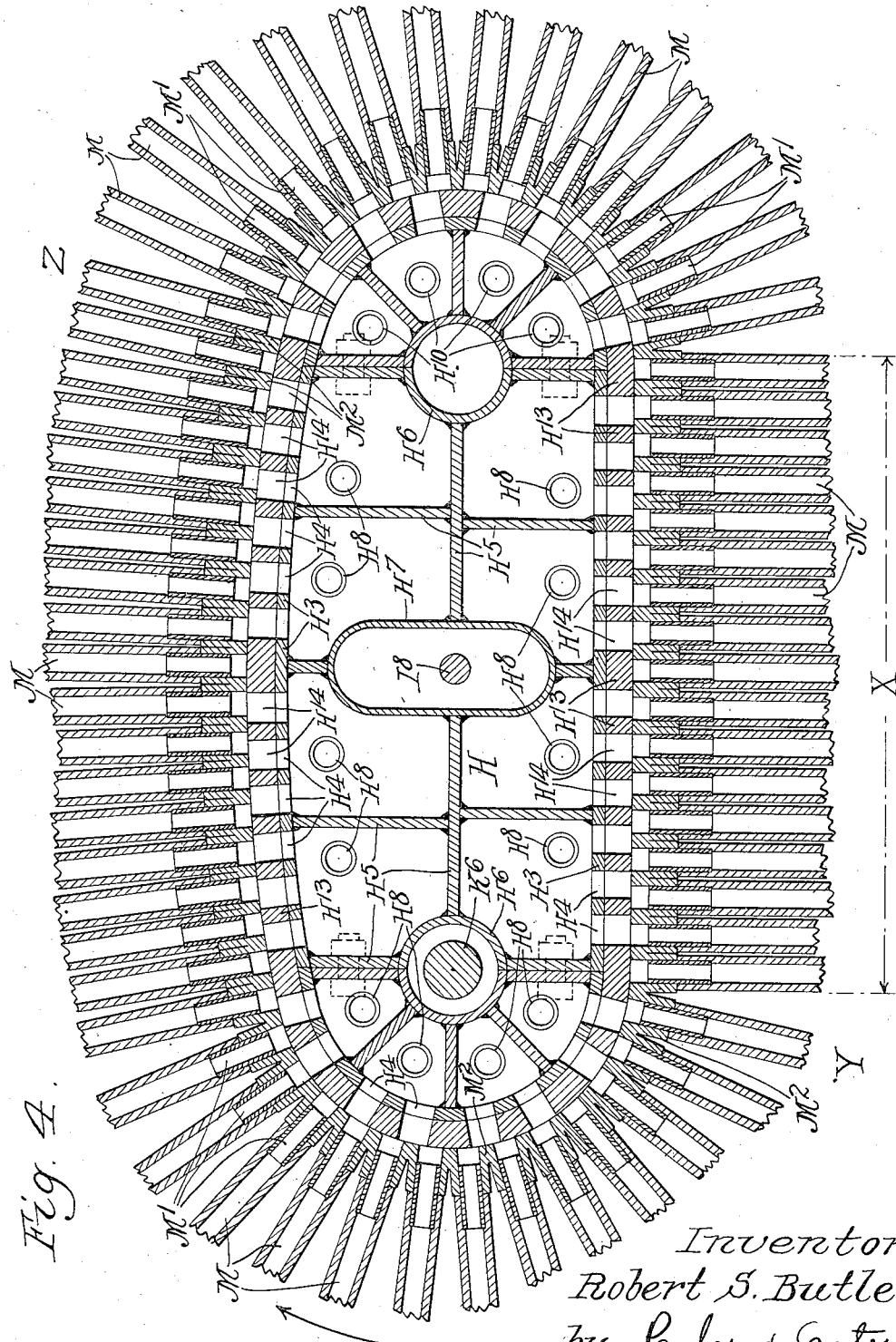

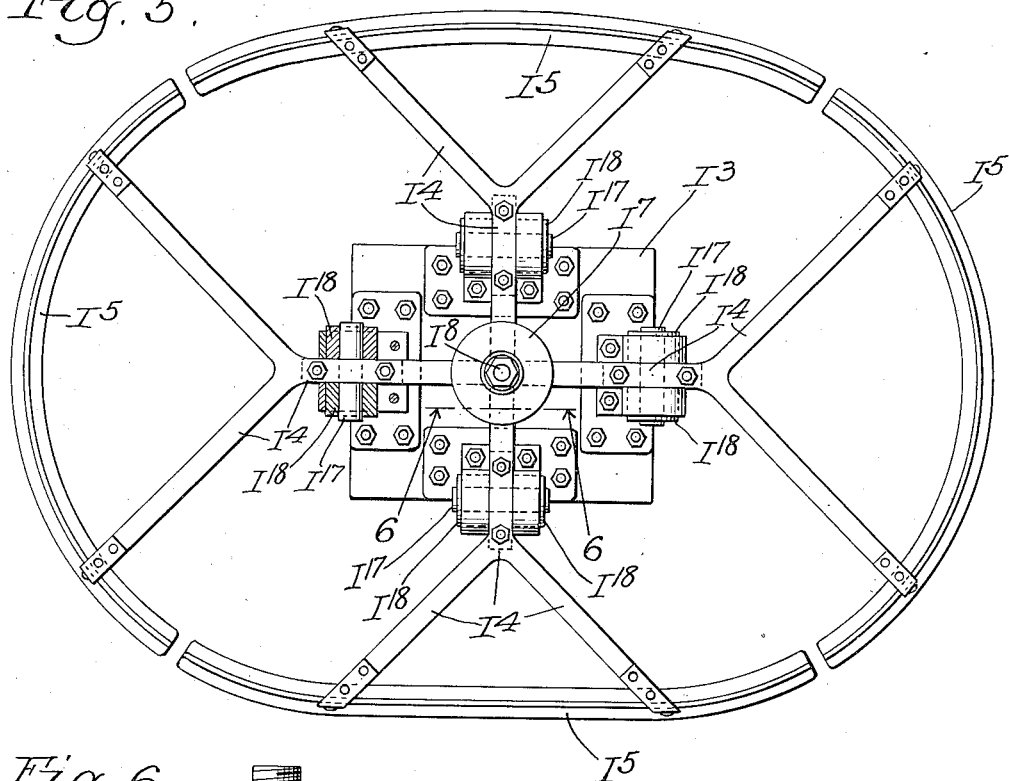
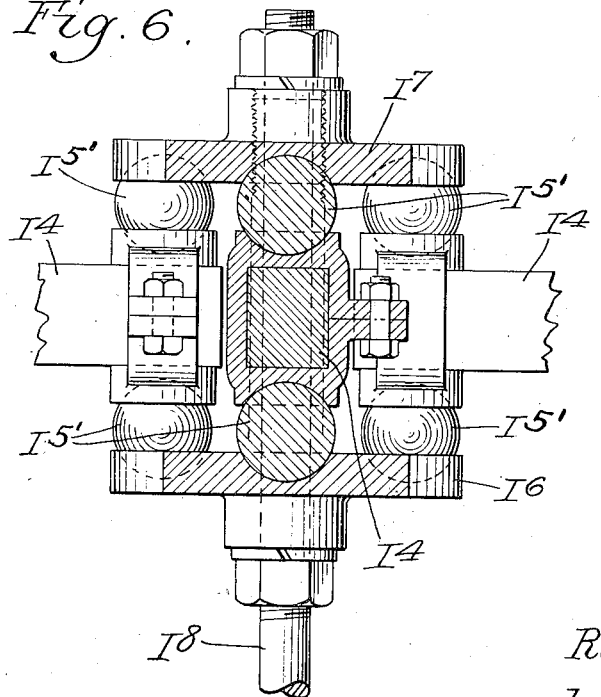

Dec. 17, 1935.  R. S. BUTLER  2,024,426
FILTER
Filed Sept. 19, 1931  7 Sheets-Sheet 7
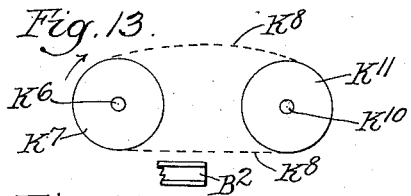
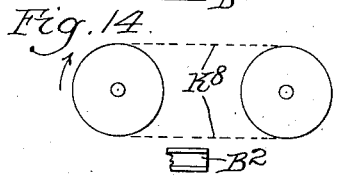
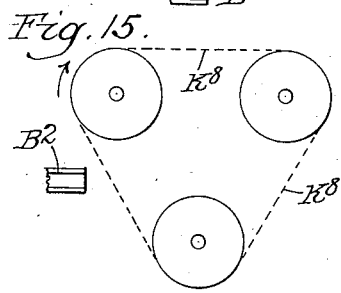
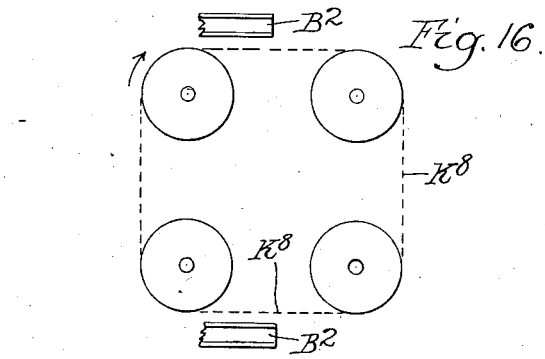
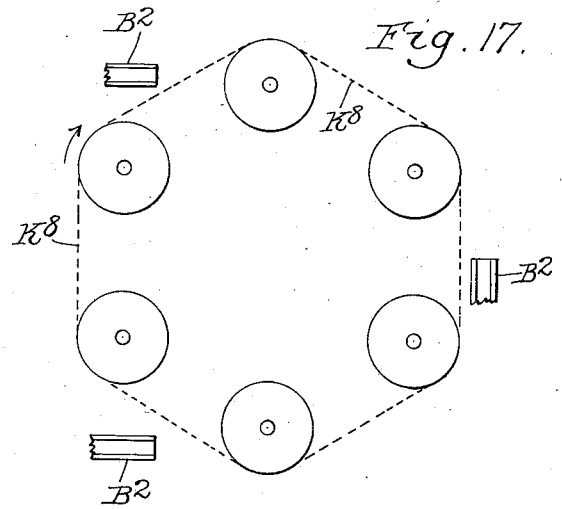
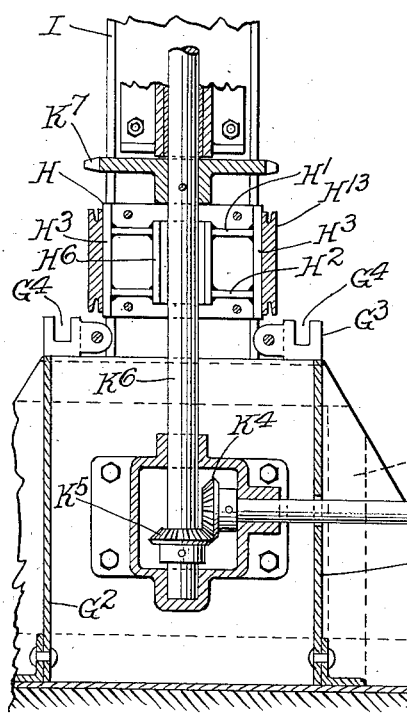
Inventor
Robert S. Butler
by Parker & Carter
Attorneys.

Patented Dec. 17, 1935

2,024,426

UNITED STATES PATENT OFFICE 2,024,426

FILTER

Robert S. Butler, Los Angeles, Calif., assignor to Nordberg Manufacturing Co., Milwaukee, Wis., a corporation of Wisconsin Application September 19, 1931, Serial No. 563,769

15 Claims. (Cl. 210—198)

My invention relates to an improvement in leaf filters, in which a series of leaves is moved, preferably in a closed circuit, the leaves being, during their movement through the closed circuit, subjected to the material to be filtered, and being also passed through a cake compacting zone and a discharge zone. The sequence of filtration, compacting and discharge may be repeated if desired, in a single circulation of a given leaf through its circuit. In other words, the material to be filtered may be delivered to the leaves at one or at two or more points along the circuit, and the drying and discharge varied accordingly.

One object is the provision of an improved type of leaf filter, in which the substance to be filtered is delivered to the leaves without necessarily passing the leaves through a tank or equivalent member. Another object is the provision of improved drying means whereby the cake formed on the exterior of the pervious member or members of the leaves shall be dried with maximum speed and efficiency. Another object is the provision of improved discharge means, whereby the formed and dried cake may be quickly and completely discharged from the individual leaves at one or more points or zones in the circuit. Another object is the provision of improved means for vibrating the individual leaves during drying and discharge. Other objects will appear from time to time in the course of the specification and claims.

I illustrate my invention more or less diagrammatically in the accompanying drawings, wherein—

Figure 1 is a side elevation;

Figure 2 is a vertical transverse section;

Figure 3 is a section on the line 3—3 of Figure 2;

Figure 4 is a section on the line 4—4 of Figure 2;

Figure 5 is a top plan view of the vibrating means;

Figure 6 is a detail section on the line 6—6 of Figure 5;

Figure 7 is a sectional view of one of the filter leaves and its supporting bracket;

Figure 8 is a detail section on the line 8—8 of Figure 7, showing one leaf as it would appear under suction and the other under a blowing action;

Figure 9 is a detail section on the line 9—9 of Figure 7;

Figure 10 is a detail section on the line 10—10 of Figure 7;

Figure 11 is an edge view of a portion of a leaf frame showing the filter cloth;

Figure 12 is a section on the line 12—12 of Figure 2; and

Figures 13, 14, 15, 16, and 17 are diagrammatic views showing variations in the machine design.

Like parts are indicated by like symbols throughout the specification and drawings.

Referring to the drawings, A generally indicates any suitable base or foundation, herein indicated as having a depression $A^1$ and a second depression $A^2$. B indicates a storage tank for the material to be filtered which may discharge, through the outlet $B^1$ through a downwardly inclined delivery trough $B^2$. $B^3$ is a hopper or a receiving member for the unfiltered liquid discharged from the below described filter. It may discharge through the passage $B^4$ to any suitable pump $B^5$ which delivers it along the passage $B^6$ to the storage tank. Thus the overflowing liquid is returned to the storage tank to be delivered again to the filter.

The filtrate delivered from the below described filter may pass through a manifold C to the filtrate receiver $C^{10}$. The filtrate is delivered from the filtrate receiver as by the passage $C^1$ controlled by a check valve $C^2$ to any suitable pump $C^3$, which delivers along the line $C^4$. $C^5$ indicates any suitable liquid level control member in the filtrate receiver $C^{10}$, which actuates a quick opening or release valve $C^6$ to the atmosphere.

Vacuum is maintained in the filtrate and filter system as by the dry vacuum pump generally indicated as D. The details of this pump form no part of the present invention and are not herein described. $D^1$ indicates a vacuum line extending from the filtrate receiver $C^{10}$, through the moisture trap $D^2$ to the pump D. $D^3$ is a filtrate line extending from the moisture trap to the line $C^1$.

E indicates a hopper to receive the discharge cake, which hopper may overlie or deliver to any suitable belt conveyor or other conveying or receiving means $E^1$.

Referring to the filter proper, G indicates a base or base plate structure provided with vertical supports $G^1$ herein shown as built up of angle iron. $G^2$ indicates any suitable brace plates. $G^3$ generally indicates a track grooved as at $G^4$, the track structure being suitably mounted upon the upright members $G^1$ with additional braces, for example, as at $G^5$.

Mounted on the members $G^1$ and braced in any suitable fashion, is a vacuum chamber member, generally indicated as H. It includes a top wall or walls $H^1$ and a bottom wall or walls $H^2$, and a ported peripheral or side wall $H^3$ provided with a plurality of apertures or ports $H^4$. $H^5$ indicates internal partition walls. Adjacent the ends of the members so formed are internal walls $H^6$, herein shown as circular in cross section, which bound apertures through the suction member. Intermediate the ends of the suction member is an additional inner wall $H^7$ which bounds a central aperture, through which a vibrating rod $I^8$ below described may pass. The various chambers formed by the partitions $H^5$ and bounded by said partitions and the walls $H^6$ and $H^7$ and the outer wall $H^3$, are provided with separate vacuum lines generally indicated as $H^8$. These may extend, for example, to the vacuum manifold C and may be controlled by individual valves or control means $H^9$. Referring to the compartments shown at the right end of Figure 4, these may be employed in connection with the discharge of the cake, in a manner later to be described. Therefore, one or more of these may be employed not as vacuum chambers but may be subjected to air pressure or may be open to the atmosphere. I indicate, therefore, inlets or outlets $H^{10}$ which are independent of the vacuum system, and may be controlled by the valves $H^{11}$. These passages $H^{10}$ may be associated with any suitable means for building up air pressure. They may be employed for example for subjecting the interiors of the leaves M to pressure in connection with the discharge of the cake therefrom. Since such means are well known they are not herein indicated in detail in the drawings, but I illustrate in Figure 1 diagrammatically the air compressor $H^{12}$, having the manifold $H^{15}$ to which the passages $H^{10}$ are connected. Secured against movement in relation to the peripheral wall $H^3$, is any suitable valve seat generally indicated as $H^{13}$, which may be of rubber, and which is ported as at $H^{14}$ in communication with the ports $H^4$.

I generally indicates a central support extending upwardly from the below described vacuum structure. Mounted upon it may be the upper track $I^1$ with its track grooves $I^2$ aligned with the lower tracks $G^3$ with their corresponding grooves $G^4$. The supports I also support transverse members $I^3$. Mounted upon the members $I^3$ are a plurality of vibrating arms $I^4$, one set of arms being mounted on each side of the machine, referring to the form shown in Figure 4. Said arms may be provided individually or in groups with contact members $I^5$, which may be in the form of segments or which conform to the path or arc described by the filter leaves, later described in detail, which are guided by the tracks $G^3$, $I^1$. The inner end of each arm $I^4$ is secured within a rubber ring or equivalent members $I^{5'}$, these members being compressed between opposite collars or abutments $I^6$ $I^7$, mounted upon a rod $I^8$, which is shown and described as passing downwardly through the aperture or bounding wall $H^7$ to the vibratory mechanism. I illustrate for example, a bearing housing $I^9$ with an exterior shaft $I^{10}$, having an eccentric $I^{11}$, which is surrounded by an eye $I^{12}$ at the lower end of the rod $I^8$. The shaft $I^{10}$ may be rotated as by the sheaves $I^{13}$, about which pass belts $I^{14}$ extending to the shaft of any suitable motor $I^{15}$, which carries corresponding sheaves $I^{16}$. The result of the rotation of said shaft $I^{10}$ is to impart a vertical or axial oscillation to the rod $I^8$, whereby the arms $I^4$ are vibrated. The individual arms $I^4$ are shown as mounted upon shafts $I^{17}$, about which are rubber bushings $I^{18}$, whereby the arms are cushioned from the supporting member during vibration.

The bushings $I^{18}$ are held against rotation and are torsionally deformable. Therefore, as each arm $I^4$ is moved from neutral position in either direction, force is stored up which is returned, causing rapid acceleration and deceleration or snap action of the arms $I^4$.

Driven, for example, by the motor $I^{15}$ through any suitable gearing or speed changing mechanism, generally indicated as K, is a pinion $K^1$ in mesh with the gear $K^2$ on the shaft $K^3$. The shaft $K^3$, from the bevel gears $K^4$ $K^5$, drives an upright shaft $K^6$ carrying the sprockets $K^7$, about which pass endless chains $K^8$, having individual links $K^9$. $K^{10}$ indicates another upright shaft having associated therewith the idler sprockets $K^{11}$ about which the chain also passes, $K^{12}$ indicating suitable supporting sleeves mounted, for example, on the brackets $K^{13}$. Associated with the links $K^9$, and for example, with each link, are the driving bars $K^{14}$. Each such bar penetrates the grooves $G^4$ and $I^2$, respectively, of the tracks $G^3$ and $I^1$, whereby the path of the chain is determined by the configuration of said tracks.

Each such driving bar $K^{14}$ has associated with it an outward extension or bracket M. The hollow of the bracket communicates by a metal nipple $M^1$ with a flexible valve belt $M^2$, which is supported thereby. The said belt $M^2$ is formed closely to engage and conform to the face of the fixed rubber valve member $H^{13}$, it being understood that the belt $M^2$ slides across the surface of the member $H^{13}$, the ports of the two members being adapted to communicate as the belt $M^2$ moves. Mounted on the upper face of each bracket M, and indicated as readily removable, is a member $M^3$, one end of which may be held, for example, by the bolt $M^4$ and the opposite slotted end by the bolt $M^5$. Mounted upon this member $M^3$, as by the springs $M^6$, is a leaf structure generally indicated as $M^7$. This structure is connected as by the flexible passages $M^8$, with the interior of the bracket M, whereby the interior of the leaf is put into communication, suctional or otherwise, with the above described filter structure.

It will be understood that many variations may be made in the type of leaf and mounting of leaf, but I illustrate herein a practical form of leaf which may be used with my device. Referring to it in detail, the flexible passage $M^8$ may be so designed as to be flexible but non-collapsible under atmospheric pressure. In the form shown, I have illustrated a solid rubber block with a plurality of individual passages $M^9$. The reflex springs $M^6$ support a circumferential metal frame $M^{10}$ which may be apertured at its upper side at $M^{11}$ to allow the contacts $N^9$ to protrude in opposition to the members or segments $I^5$, whereby the entire leaf structure may be vibrated.

The leaf proper may include a rubber frame N positioned within the metal frame $M^{10}$. The rubber frame N may be channeled as at $N^1$ to receive a tubular frame $N^2$, which is the frame for the leaf grid. The leaf member includes a suitable pervious substance, such as the filter cloth $N^3$, which may form a closed chamber. In fact, the grid structure is enclosed in the septum or bag formed by the filter cloth $N^3$, which may be sewed, for example as at $N^4$, to form a closed bag structure, the seams being enclosed between the tubular frame $N^2$ and the rubber frame N. Positioned within the bag or septum so formed are a plurality of coil springs $N^5$, which may be secured at each end to the tubular frame $N^2$. These springs have for effect to support the cloth and to prevent its collapse under vacuum, and at the same time to be so flexible as to follow the movement of the cloth while it is being vibrated.

In the operation of the device, the leaves at one or more points in their circuit are in closely opposed and parallel relationship. In order to seal the leaves together to form a filling chamber, I may provide any suitable packing means between adjacent leaves to prevent the leakage of pulp from the chambers so formed. As an example of such structure, I illustrate an inner support $N^6$, which may be suitably mounted upon the rubber frame N. Surrounding it is a rubber gasket $N^7$ of tubular form, the interior diameter of which is considerably greater than the exterior diameter of the member $N^6$. It will be seen, as in Figure 8, that the opposed faces of adjacent rubber frames are inclined, as at $N^8$, to form a wedge-shaped cavity when the parts are closely opposed. The gasket $N^7$ is wedged in this wedge-shaped cavity with the large end of the cavity inward. Thus the pressure of the fluid between the leaves tends to lock the rubber gasket against the opposed faces $N^8$, thus preventing or sharply reducing leakage.

It will be realized that whereas I have described and shown a practical and operative device, nevertheless many changes may be made in size, shape, number, relation and disposition of parts, without departing from the spirit of my invention. Also, modifications of design may be made to meet the problems involved in filtering of various materials. For example, I illustrate in Figures 13 to 17 variations of the mechanism shown in the earlier figures. Whereas, in the form of Figures 3 and 4, I illustrate a single set of driving sprockets and a single set of idler sprockets, I may employ additional sprockets to render the belt generally triangular in cross section or quadrangular, or having a greater number of sides or corners. Such a multisided belt may be of advantage, for example, in quick filtering or in quick drying materials, and I have, therefore, illustrated in the said figures filters the leaves of which, in their closed path, may pass through a plurality of filtering zones. For example, in Figures 16 and 17, in the place of the single delivery chute or trough $B^2$ of Figure 1, I illustrate a plurality of such troughs, which may feed the liquid to the belt or to the leaves at a plurality of points. I give these variations as examples of the flexibility of adaptation of my device, and it will, therefore, be realized that I wish my description and drawings to be taken as in a broad sense illustrative rather than as limiting me to the particular device or devices herein shown.

The use and operation of my invention are as follows:

Referring, for example, to Figure 1, any suitable means may be provided for maintaining a flow of the material to be filtered. I illustrate a storage tank B with a delivery trough $B^2$, but any other suitable means may be employed for supplying and controlling the liquid. In the normal use of the device herein shown, the leaves and the tracks are so shaped and proportioned that along one or more zones, for example, the zone illustrated as X in Figure 4, the leaves take a parallel position in close approach to each other. The U-shaped gaskets $N^7$ seal the space between adjacent leaves so that each space is in effect an open topped container into which the fluid to be filtered flows. As the leaves pass through the zone of fluid delivery, the septum or cloth $N^3$ on each side of each such container is subjected to the fluid. At the same time suction is maintained from the passages $H^8$ in communication with the suction manifold C. This suction serves to draw the liquid from the filtering medium and results in the formation of a cake of solids on the outside of each cloth $N^3$. As the leaves pass in their path beyond the limits of the straight suction X, the seal between adjacent leaves is broken, the members $N^7$ being no longer effective to maintain a closed compartment. Whatever liquid has not already been drawn through the leaf, may then fall into the hopper $B^3$ for return by the pump $B^5$ to the storage tank B.

I find it advantageous to vibrate the individual leaves during the drying of the cake. The cake is subjected to the atmosphere when the individual leaves separate, for example, at the initial zone of separation, starting at the point marked Y in Fig. 4. The suction is meanwhile maintained so that atmospheric air is drawn through the cakes, tending to dry them. During this drying process the vibration of the arms $I^4$ is effected to vibrate the leaf structure in a generally vertical plane. I illustrate, for example, a downward tapping against the leaf from the recurved spring $M^6$, cushioning the vibration and preventing vibration of the bracket M. This vibration results in rapid drying and compacting of the cake in accordance with the method illustrated in co-pending application No. 555,275, filed August 5, 1931, in the name of Harry W. Newton, and assigned to the assignee of the present application. The vibration and suction may be maintained any suitable distance, for example, all the way to the point indicated as Z in Fig. 4. As an illustration, I may cut off the suction altogether from Z to the initiation of the X space of liquid delivery while maintaining vibration. During the drying stage the suction holds the cake against the surface of the cloth $N^3$ even though the leaf is being vibrated. When the suction is cut off, and assuming that the vibration is continued, the vibration tends to free the cake from the leaf, and this tendency is not resisted by suction. Therefore, the cake sloughs off in the discharge zone at the right end of the structure of Fig. 4, and is received in the hopper E for any suitable disposal. In many cases it may be desirable to direct pressure through the apertures or passages $H^{10}$, as shown at the right hand end of Figure 4 in order actually to subject the interiors of the leaves to the pressure of a gas, such as air, to belly out the filter medium, which tends to break the connection between the cake and the fabric ordinarily used. It is frequently desirable to vibrate either during or after the application of this pressure to the leaf.

Whereas I have described as a typical cycle the maintenance of vibration continuously from Y to the end of the delivery zone, it will be understood that vibration may be interrupted at any desired point or points. However, as long as a leaf is being vibrated, it should also be under suction until discharge is desired, because vibration without suction will disturb or discharge the cake. The length of the path taken by an individual leaf during its cycle may vary a great deal, depending on the liquids and materials filtered. Some materials dry much faster than others and hence the possibility of effecting more than one sequence of cake formation, cake drying and cake discharge on a given circuit.

I claim:

1. In a filter, a plurality of leaves and means for moving said leaves through a predetermined closed circuit, including a plurality of superposed chains, members connecting said chains, sprockets for said chains and means for rotating said sprockets about a generally vertical axis, and brackets laterally extended from said connecting members, the individual filter leaves being supported upon said brackets, and means for subjecting said leaves to the fluid to be filtered.

2. In a filter, a plurality of leaves and means for moving said leaves through a predetermined closed circuit, including a plurality of superposed chains, members connecting said chains, sprockets for said chains and means for rotating said sprockets about a generally vertical axis, and brackets laterally extended from said connecting members, the individual filter leaves being yieldingly supported upon said brackets, and means for subjecting the leaves to the fluid to be filtered.

3. In a filter, a plurality of leaves and means for moving said leaves through a predetermined closed circuit, including a plurality of superposed chains, members connecting said chains, sprockets for said chains and means for rotating said sprockets about a generally vertical axis, and brackets laterally extended from said connecting members, the individual filter leaves being yieldingly supported upon said brackets, and means for subjecting the leaves to the fluid to be filtered, and means for vibrating said leaves.

4. In a filter, which includes a plurality of filter leaves having septa and means for moving the leaves through a closed path, means for subjecting said leaves to the fluid to be filtered, means for maintaining a pressure differential on opposite sides of each septum during such subjection, and means for vibrating said septum during the maintenance of said differential, and yielding means, associated with each such leaf, adapted to cushion the vibration.

5. In a filter, a plurality of leaves, means for subjecting said leaves to the fluid to be filtered, and means for moving them through a closed path, including sprockets and means for rotating the sprockets about vertical axes, a plurality of chains, positioned one above another, passing about and driven by said sprockets, connector members secured to said chains and brackets outwardly extending from said connector members, the filter leaves being mounted on said brackets.

6. In a filter, a plurality of leaves, means for subjecting said leaves to the fluid to be filtered, and means for moving them through a closed path, including sprockets and means for rotating the sprockets about vertical axes, a plurality of chains, positioned one above another, passing about and driven by said sprockets, connector members secured to said chains and brackets outwardly extending from said connector members, the filter leaves being mounted on said brackets, a plurality of vacuum chamber elements, and means for putting the interiors of the filter leaves in communication with said vacuum chambers.

7. In a filter, a plurality of leaves, means for subjecting said leaves to the fluid to be filtered, and means for moving them through a closed path, including superposed sprockets and means for rotating them about vertical axes, a plurality of chains positioned one above another, passing about and driven by said sprockets, connector members secured to said chains and brackets outwardly extending from said connector members, the filter leaves being mounted on said brackets, a plurality of vacuum chamber elements, said brackets having formed therein passages in communication with said filter leaves, and means for obtaining communication between said passages and the vacuum chambers.

8. In a filter, a plurality of filter leaves and means for moving them through a predetermined closed circuit, means for maintaining a liquid tight connection between adjacent leaves during a predetermined portion of their travel through the circuit, means for delivering the material to be filtered to the spaces between said leaves when so positioned in liquid tight relationship, and means for vibrating said leaves during the period of supply of liquid thereto.

9. In a filter, a plurality of leaves and means for subjecting them to the material to be filtered, means for moving said leaves through a predetermined closed circuit, including supporting means for the individual leaves, said supporting means underlying the lower edge of each said leaf, and vibratory means adapted to impart vibration to the individual leaves, said vibratory means being adapted for operative engagement with the upper edge of each such leaf.

10. In a filter, a plurality of filter leaves, and means for moving them, while in upright position through a predetermined closed circuit, means for subjecting said leaves to the material to be filtered, and means opposed to the upper edges of said leaves for imparting vibration thereto in the general plane of the leaf.

11. In a filter, a plurality of filter leaves yielding supports for said filter leaves adapted to permit their ready vibration and means for moving said filter leaves through a predetermined closed circuit, including a driving sprocket, a chain member and means for rotating said sprocket about a generally vertical axis, the path of movement of the chain member and the filter leaves being substantially horizontal, and means for subjecting said leaves to the fluid to be filtered, while said leaves travel in said horizontal path, said leaves lying in generally perpendicular planes during their subjection to the liquid to be filtered.

12. In a filter, a plurality of filter leaves yielding supports for said filter leaves adapted to permit their ready vibration and means for moving said filter leaves through a closed and generally horizontal circuit, said means including a driving sprocket, a chain member and means for rotating said sprocket about a generally vertical axis, means for supporting said leaves in generally vertical position while extending outwardly from the chain, and means for subjecting said leaves to the fluid to be filtered during the movement of said leaves through their horizontal circuit, said leaves lying in generally perpendicular planes during their subjection to the liquid to be filtered.

13. In a filter, a main filter base, a hollow filter leaf movably mounted on said base, a flexible mounting interposed between said leaf and said base and adapted to permit ready vibration of said leaf, means for subjecting the interior of the leaf to suction, means for subjecting the leaf, during such suction, to a liquid to be filtered and means for independently vibrating said leaf at predetermined times during the filtering cycle.

14. In a filter, a main filter base, a plurality of hollow filter leaves movably mounted on said base and means for moving and guiding said leaves through a predetermined circuit, a flexible mounting interposed between each said leaf and said base and adapted to permit ready vibration of said leaf, means for subjecting the interior of the leaf to suction, means for subjecting the leaf to a liquid to be filtered and means for independently vibrating said leaf at predetermined times during the filtering cycle.

15. In a filter, a main filter base, a hollow filter leaf movably mounted on said base, a flexible mounting interposed between said leaf and said base and adapted to permit ready vibration of said leaf, means for subjecting the leaf to a liquid containing solids to be filtered, means for causing the liquid to pass through the walls of the leaf depositing the solid matter on its exterior surface, and means for independently vibrating said leaf at predetermined times during the filtering cycle.

ROBERT S. BUTLER.